(12) United States Patent
Koops Kratmann et al.

(10) Patent No.: US 11,408,393 B2
(45) Date of Patent: Aug. 9, 2022

(54) PROTECTIVE SHIELD WITH POSITIONING MARK

(71) Applicant: SIEMENS GAMESA RENEWABLE ENERGY A/S, Brande (DK)

(72) Inventors: Kasper Koops Kratmann, Horsens (DK); Nikolai Bak Grishauge, Nibe (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 173 days.

(21) Appl. No.: 16/613,128

(22) PCT Filed: Apr. 3, 2018

(86) PCT No.: PCT/EP2018/058484
§ 371 (c)(1),
(2) Date: Nov. 13, 2019

(87) PCT Pub. No.: WO2018/219524
PCT Pub. Date: Dec. 6, 2018

(65) Prior Publication Data
US 2020/0141382 A1 May 7, 2020

(30) Foreign Application Priority Data

May 31, 2017 (DE) ...................... 10 2017 209 214.9

(51) Int. Cl.
*F03D 1/06* (2006.01)
*F03D 80/00* (2016.01)

(52) U.S. Cl.
CPC ........... *F03D 1/0675* (2013.01); *F03D 80/00* (2016.05); *F05B 2230/604* (2013.01); *F05B 2240/30* (2013.01); *F05B 2260/95* (2013.01)

(58) Field of Classification Search
CPC .... F03D 1/0675; F03D 80/00; F05D 2240/30; F05D 2260/95; F05B 2230/604; Y02P 70/50; Y02E 10/72
See application file for complete search history.

(56) References Cited

U.S. PATENT DOCUMENTS 5,908,522 A * 6/1999 Lofstrom .............. B64C 27/473
29/402.09
8,770,942 B2 * 7/2014 Saitou ................... F03D 1/0675
416/224

(Continued)

FOREIGN PATENT DOCUMENTS

CN 1847428 A 10/2006
CN 201786551 U 4/2011
(Continued)

OTHER PUBLICATIONS

Gollnick DE102013210737A1, English Machine Translation of Specification by EPO, Jul. 23, 2021 (Year: 2014).*
(Continued)

*Primary Examiner* — David E Sosnowski
*Assistant Examiner* — Wayne A Lambert
(74) *Attorney, Agent, or Firm* — Schmeiser, Olsen & Watts LLP

(57) ABSTRACT

A protective shield for a rotor blade of a wind turbine is provided. The shield protects the leading edge section of the rotor blade from erosion, and covers at least a part of the leading edge of the rotor blade. The shield is preformed with a shape which approximately corresponds to the contour of the leading edge section where it is destined to be mounted to. The shield includes a mark which allows to accurately position the shield at a predetermined position on the surface of the rotor blade or which allows to accurately position a tool at a predetermined position on the surface of the shield. A method of accurately positioning a protective shield on the (Continued)

surface of a rotor blade of a wind turbine and a method of documenting how precisely the shield has actually been attached to the surface of the rotor blade is also provided.

15 Claims, 5 Drawing Sheets

(56) References Cited

U.S. PATENT DOCUMENTS

| | | | | |
|---|---|---|---|---|
| 9,494,132 | B2* | 11/2016 | Riddell | F03D 13/10 |
| 2006/0038099 | A1 | 2/2006 | Kalinowski | |
| 2006/0275626 | A1 | 12/2006 | Bernard et al. | |
| 2011/0233819 | A1 | 9/2011 | Kulenkampff | |
| 2012/0034094 | A1 | 2/2012 | Wansink | |
| 2013/0101426 | A1 | 4/2013 | Saitou et al. | |
| 2013/0129520 | A1* | 5/2013 | Enevoldsen | F03D 1/0633 |
| | | | | 416/235 |
| 2014/0186188 | A1 | 7/2014 | Takeuchi | |
| 2014/0241880 | A1 | 8/2014 | Madsen | |
| 2016/0169190 | A1* | 6/2016 | Neumann | F03D 1/0675 |
| | | | | 29/889.21 |
| 2017/0058863 | A1 | 3/2017 | Yarbrough et al. | |
| 2017/0248116 | A1* | 8/2017 | Fukami | F03D 1/0675 |
| 2017/0248117 | A1* | 8/2017 | Fukami | F03D 1/0675 |
| 2017/0314532 | A1 | 11/2017 | Kirkegaard et al. | |
| 2018/0209400 | A1* | 7/2018 | Drachmann Haag | B32B 37/02 |
| 2019/0001534 | A1 | 1/2019 | Tangager | |
| 2019/0277247 | A1* | 9/2019 | Kratmann | F03D 80/00 |
| 2020/0080545 | A1* | 3/2020 | Cao van Truong | F03D 80/30 |

FOREIGN PATENT DOCUMENTS

| | | | | |
|---|---|---|---|---|
| CN | 102248618 | A | | 11/2011 |
| CN | 102421254 | A | | 4/2012 |
| CN | 102792017 | A | | 11/2012 |
| CN | 103917445 | A | | 7/2014 |
| CN | 205149120 | U | | 4/2016 |
| CN | 105822511 | A | | 8/2016 |
| CN | 109268203 | A * | | 1/2019 |
| DE | 102008006427 | A1 | | 7/2008 |
| DE | 102011055478 | A1 | | 5/2012 |
| DE | 102013210737 | A1 | | 12/2014 |
| DE | 102015220672 | A1 | | 4/2017 |
| DK | 201570881 | A1 | | 1/2017 |
| EP | 2738383 | A1 * | 6/2014 | F03D 1/0675 |
| EP | 2927482 | A1 | | 10/2015 |
| EP | 3279468 | A1 * | 2/2018 | F03D 9/25 |
| WO | 2012082324 | A1 | | 6/2012 |
| WO | 2016075619 | A1 | | 5/2016 |

OTHER PUBLICATIONS

Society of Photo-Optical Instrumentation Engineers: High-precision inspection and alignment of surface mounting devices to Chung et al., pp. 1820-1827 (Jul. 1996) (Year: 1996).*
Office Action in corresponding Chinese Patent Application No. 01880035825.3 dated Feb. 7, 2021. 8 pages.
International Search Report and Written Opinion of the International Searching Authority dated Jul. 5, 2018 for Application No. PCT/EP2018/058484.
Office Action in corresponding Chinese Patent Application No. 201880035825.3 dated Jun. 24, 2020. 8 pages.

* cited by examiner

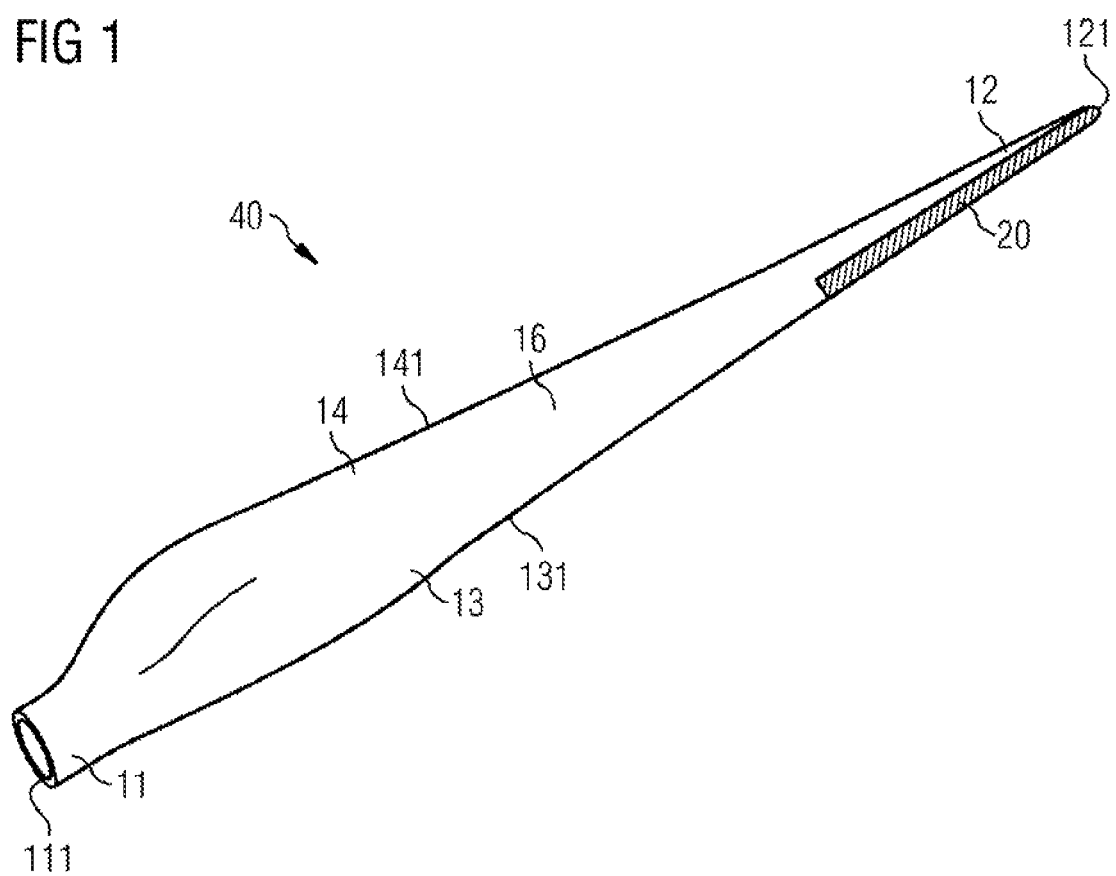

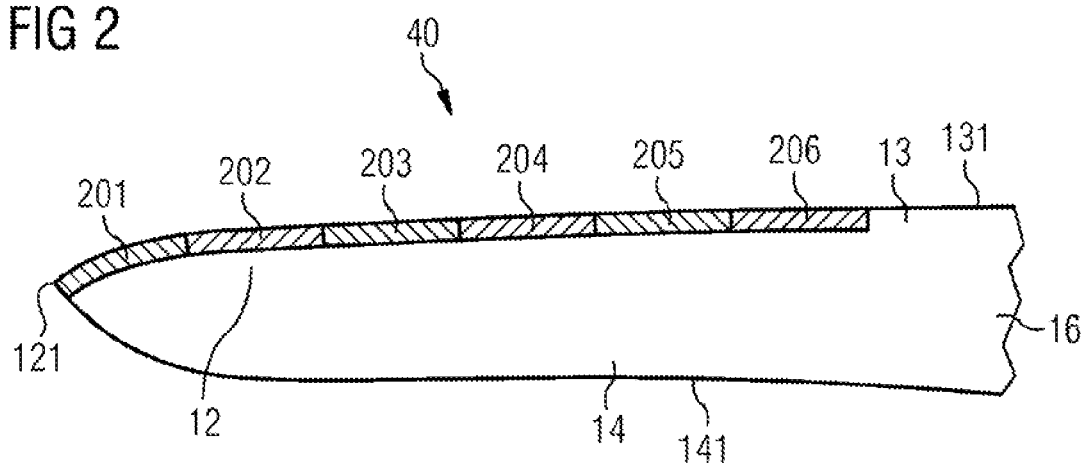
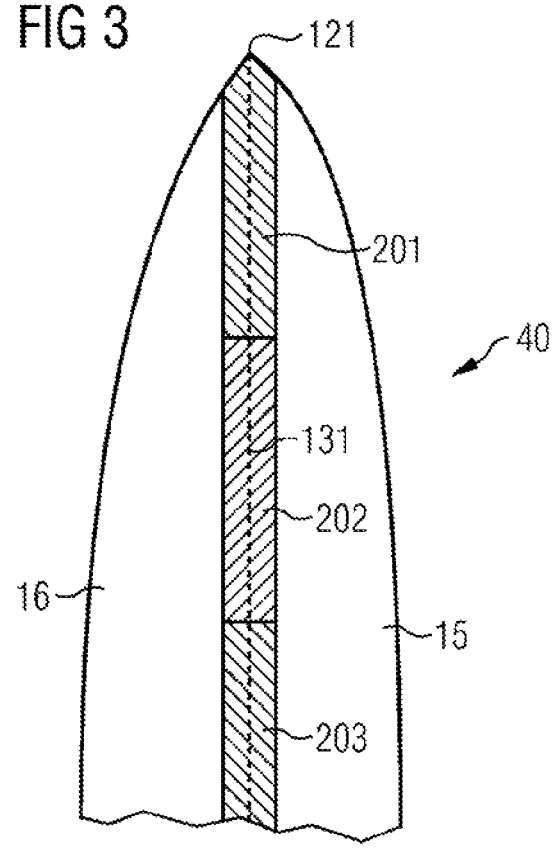

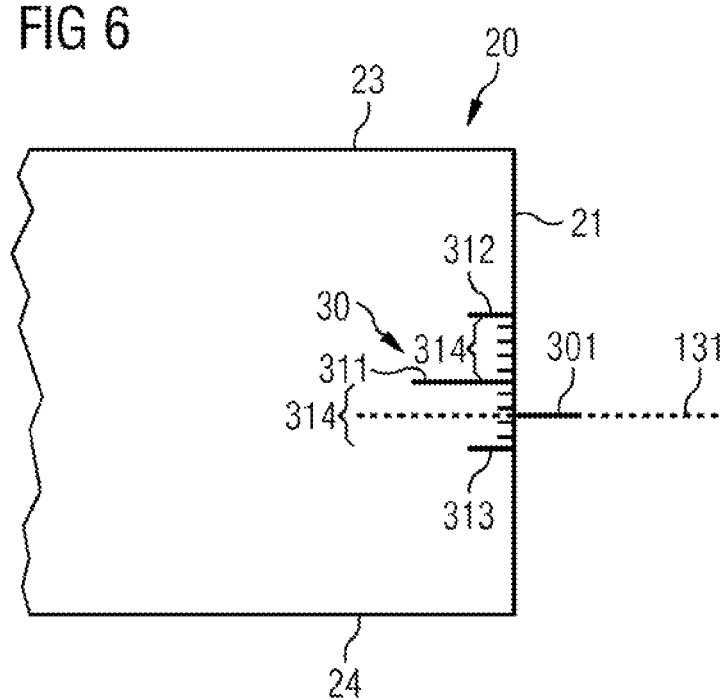
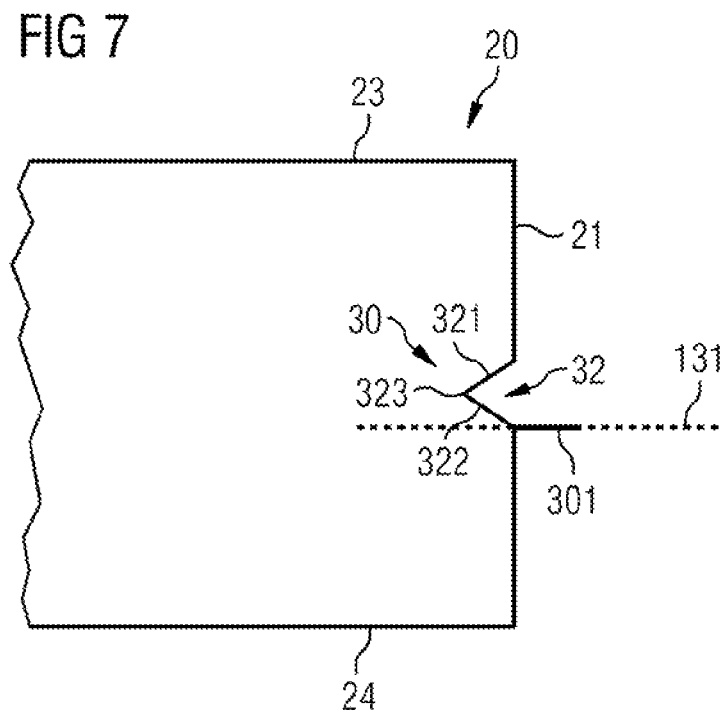

PROTECTIVE SHIELD WITH POSITIONING MARK

CROSS-REFERENCE TO RELATED APPLICATIONS

This application claims priority to PCT Application No. PCT/EP2018/058484, having a filing date of Apr. 3, 2018, which is based on German Application No. 10 2017 209 214.9, having a filing date of May 31, 2017, the entire contents both of which are hereby incorporated by reference.

FIELD OF TECHNOLOGY

The following relates to a protective shield for a rotor blade of a wind turbine, wherein the shield protects the leading edge section from erosion. The following also relates to an arrangement comprising a rotor blade of a wind turbine and such a protective shield. Finally, the following relates to a method of accurately positioning the protective shield on the surface of the rotor blade and, specifically, of documenting how precisely the shield has actually been attached to the surface of the rotor blade.

BACKGROUND

A protective shield may comprise a certain flexibility and is in this case also known as a "soft shell". Protective shields have recently become a popular means of coping with the problem of leading edge erosion at wind turbine rotor blades. Protective shields may in principle also be mounted on new blades, but they are mainly used as retrofit solutions on already installed wind turbines, as leading edge erosion typically occur after several years in operation under harsh external conditions.

The aerodynamic performance of a wind turbine blade is generally highly sensitive to the correct positioning of the soft shell. Because of the flexibility of the soft shell, correct positioning is not intuitive from "shape fit" itself. In addition, just as challenging as the positioning of the shell is the documentation of the correct positioning of the protective shell towards the customer.

SUMMARY

An aspect relates to an improved concept how to accurately mount a protective shield on the surface of a rotor blade of a wind turbine.

According to embodiments of the invention, there is provided a protective shield for a rotor blade of a wind turbine, wherein the shield is destined to protect the leading edge section from erosion. The rotor blade comprises a trailing edge section with a trailing edge and a leading edge section with a leading edge. The trailing edge and the leading edge divide the outer surface of the rotor blade into a suction side and a pressure side. The rotor blade further comprises a root and a tip. The shield is furthermore destined to cover at least a part of the leading edge of the rotor blade. The shield is preformed with a shape which approximately corresponds to the contour of the leading edge section where it is destined to be mounted to. The shield comprises a root end which is destined to face towards the root of the rotor blade and a tip end which is destined to face towards the tip of the rotor blade. In addition, the shield comprises a mark which allows to accurately position the shield at a predetermined position on the surface of the rotor blade or which allows to accurately position a tool at a predetermined position on the surface of the shield.

The provision of a mark at the shield allows for a point of reference. This point of reference can be aligned with another point of reference, e.g. a corresponding mark. The mark at the shield can also be aligned with a characteristic feature of the rotor blade, such as a part of the rotor blade which is, for instance, shaped in a characteristic and unique manner.

The accurate positioning of the protective shield on the surface of the rotor blade is of utmost importance. The design of the shield is typically aerodynamically optimized, resulting, for instance, in different thicknesses of the shield (the center part may be thickest, with a decreasing thickness of the shield towards its upper and lower edge). Experiences have shown that a misalignment of the shield by a few millimeters could already negatively impact the aerodynamic efficiency of the rotor blade, and ultimately the annual energy production of the wind turbine. Therefore, a reliable and accurate positioning of the shield compared to the foreseen position is advantageous.

In a first embodiment of the invention, the mark comprises at least one indicator.

The indicator can, for example, be realized as a line. The indicator can exemplarily be printed and/or engraved into the shield. If the indicator is engraved, care needs to be taken that the structural integrity and stability of the shield is not compromised. Alternatively, there could be provided a complementary mark in the mold being used during manufacturing the protective shield, wherein the complementary mark leaves a corresponding imprint at the shield.

An effective way of realizing the mark at the shield is to engrave one indicator and subsequently imprint the further indicators (if any), wherein for the imprint of the further indicators the engraved indicator is taken as a reference. This has the advantage that if design changes for the imprinted indicators are needed, this can be realized in a relatively easy manner compared to a change in the (hardware) configuration of the engraving means.

In principle, one single indicator at the shield is sufficient to provide for indicating a point of reference. The advantage of providing only one indicator is a minimum of structural and aesthetic impact on the shield.

Advantageously, however, a plurality of indicators are provided. Exemplarily, one indicator indicates an optimum alignment with a corresponding mark at the rotor blade, and one or more further indicators indicate a range of tolerance in which positioning of the shield on the surface of the rotor blade is still acceptable.

In an embodiment of the invention, the mark is designed as a scale and particularly comprises a linear graduation.

This has the advantage that an enhanced precision regarding the accuracy of the positioning of the shield is enabled. A scale is understood as a marker with a plurality of indicators and a corresponding labeling. A linear graduation is understood as scale with linear measures, such as inches or millimeters, similar to a ruler. For comparison, a non-linear graduation would comprise a logarithmic scale.

In a second embodiment of the invention, the mark is designed as a notch at one of the ends of the shield.

In other words, the shield comprises a notch either at the root end or at the tip end of the shield. Such a notch may also serve as a point of reference and may also be able to align the positioning of the shield on the surface of the rotor blade. A notch may also be referred to as an indentation or as a cut-out.

Exemplarily, the notch is shaped as a V-shaped cutout comprising a first flank and a second flank, wherein the first flank and the second flank meet at a common endpoint.

In other words, the notch may have a triangular shape as viewed in a top view. In particular, the shape of the notch in a top view may resemble to an isosceles triangle. If the notch is described as a triangle, the common endpoint of the first and second flanks can be referred to as a vertex.

A V-shaped notch has the advantage that it is easy to provide and, at the same time, enables a relatively accurate positioning of the shield with regard to a corresponding mark at the surface of the rotor blade.

A combination of the first and second embodiment of the invention would comprise a shield which comprises a V-shaped notch and a plurality of indicators at at least one of the flanks of the notch.

Such a mark allows both an easy alignment of the shield with a corresponding mark of the rotor blade and an easy and accurate assessment regarding the precision of the alignment.

Alternatively, the mark may be designed as a circular cut-out, wherein the diameter of the cut-out is equal to the tolerance band of the mark.

In an embodiment of the invention, the mark is provided at the root end of the shield.

The background of this specific feature of the shield is as follows: Typically, the protective shield is segmented into a plurality of shields. As the individual shields are advantageously connected to each other such that no edges, gaps or steps can spoil the airflow and hence spoil the aerodynamic efficiency of the rotor blade, adjacent shields often overlap in a specific, relatively small area. In order to realize a constant thickness along the transition or overlap area, the thickness of the individual shields may thus decrease (or taper) towards the root and tip ends.

Assuming overlapping shield segments and assuming further that the mark at the shield is compared and aligned with a corresponding mark at the surface of the rotor blade, which is e.g. designed as a line and symbolizing the leading edge, then only a mark which is visible at that end, which is arranged directly on the surface of the rotor blade and not on a remaining part of an adjacent shield segment is useful.

If the mounting procedure is carried out from the tip of the rotor blade towards its root, a provision of the mark at the root end of the shield is beneficial.

Note, that also a mark realized as a line which extends over the entire length from the root end of the shield to the tip end of the shield is another option which could be advantageous.

In a preferred embodiment, the mark is provided at the outer surface of the shield. In this respect, "outer" surface relates to the surface of the shield which is destined not to be attached and connected to the surface of the rotor blade.

However, in principle, there also exists the option to provide the mark at the inner surface of the shield, which is defined as that surface which is destined to be attached and connected to the surface of the rotor blade. Thus, in other words, the mark could also be provided at the inside of the protective shield.

Advantageously, the position of the mark of the shield is destined to be compared with the position of a corresponding mark being provided on the surface of the rotor blade, such as a line indicating the pathway of the leading edge of the rotor blade.

Note that the leading edge of the rotor blade could be determined via an appropriate tool which takes the sharp trailing edge as a point of reference. The leading edge may in principle be marked by a continuous line, but may also be only marked selectively by relatively small line segments.

As a variant, the position of the mark of the shield is destined to be compared with the position of a corresponding mark being provided on another shield. In this case, the other shield may be a shield which is already mounted on the surface of the rotor blade. Then, if the shield yet to be mounted comprises a mark, such as a line indicating the pathway of the leading edge of the rotor blade at its tip end, this mark at the tip end of the shield can be aligned with a corresponding mark at the root end of the already mounted shield.

Advantageously, the shield is a flexible shield.

In other words, particularly for "soft shells" which feature a certain flexibility, and which do not "shape fit" themselves, embodiments of the present invention are advantageous. However, also "hard shells" can in principle be equipped with the marker of embodiments of the present invention, e.g. for further improving the accuracy of the mounting or only a means to monitor the mounting precision.

In another embodiment of the invention, the mark of the shield is intended to be used to accurately position a tool at a predetermined position on the surface of the shield.

An example of such a tool is a heat blanket, in particular a vacuum heat blanket, for curing an adhesive such as a latently reactive adhesive film.

The protective shield may be attached to the surface of the rotor blade by means of an adhesive, which needs to be cured in order to deploy its adhesive properties. Curing may advantageously be carried out by applying heat to the adhesive. In the case of the shield attached to the surface of the rotor blade, one or several heating blankets may be arranged at the shield. In this respect, an accurate positioning of the heat blanket(s) on the surface of the shield is important in order to ensure that the entire adhesive is entirely cured. Thus, a reliable attachment of the protective shield to the surface of the rotor blade can be ensured.

The mark at the shield may be realized as a line which is situated between the root end and the tip end of the shield. In particular, the line may be orientated substantially in parallel to the root end and the tip end of the shield.

Note that embodiments of the invention are not only related to the protective shield as such, but also to an arrangement comprising a rotor blade of a wind turbine and a protective shield as described above. In this case, the shield is firmly attached to the surface of the rotor blade.

One example of a suitable attachment is via a latently reactive adhesive film.

Furthermore, embodiments of the invention are related to a method of accurately positioning a protective shield on the surface of a rotor blade of a wind turbine. The method comprises the following steps:

a) providing the shield with the characteristics as described above, and b) positioning the shield on the surface of the rotor blade such that the mark of the shield coincides to a predetermined degree with a corresponding mark on the surface of the rotor blade.

Under a "predetermined degree", a predetermined error tolerance, or, in yet other words, an acceptable deviation from an optimum alignment is understood.

Specifically, the mark of the shield can be designed as a scale, and the corresponding mark on the surface of the rotor blade can be a line indicating the pathway of the leading edge of the rotor blade. In this case, the step of positioning the shield advantageously involves aligning the shield such that the line representing the leading edge is within a predetermined range of the scale being provided at the shield.

Note that the line does not necessarily need to be a continuous line, but may also just indicate at that section of the leading edge section where it is needed the precise pathway of the leading edge.

Finally, embodiments of the present invention also relate to a method of documenting how precisely a protective shield has actually been attached to the surface of a rotor blade of a wind turbine. The method comprises the following steps:

a) taking a photo of the shield being attached to the rotor blade comprising the mark of the shield and the corresponding mark of the rotor blade, and b) saving the photo in a suitable format.

As an additional, optional step, a further step may include to c) analyze by a computer program to which extent the position of the mark of the shield coincides with the position of the corresponding mark of the rotor blade.

By this method, a low-cost, low-effort method is provided for reliably documenting and, optionally, even assessing the precision of the mounting of a protective shield on a surface of a rotor blade.

BRIEF DESCRIPTION

Some of the embodiments will be described in detail, with reference to the following figures, wherein like designations denote like members, wherein:

FIG. 1 shows a perspective view of a rotor blade of a wind turbine with a leading edge protection shield;

FIG. 2 shows a top view onto the pressure side of the tip section of a rotor blade with a leading edge protection shield;

FIG. 3 shows a top view onto the leading edge of the tip section of a rotor blade with a leading edge protection shield;

FIG. 6 shows a second embodiment of a shield with a mark;

FIG. 7 shows a third embodiment of a shield with a mark;

DETAILED DESCRIPTION

Figure 4:
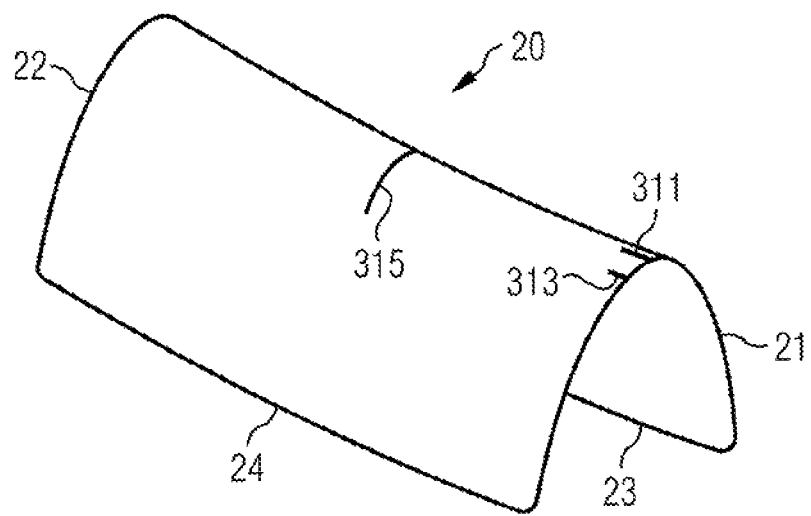
FIG. 4 shows a perspective view of a protective shield according to embodiments of the invention.

FIG. 1 shows a perspective view of a rotor blade 10 and a leading edge protection shield 20. In other words, FIG. 1 illustrates an arrangement 40 comprising a rotor blade 10 of a wind turbine and a protective shield 20. The rotor blade 10 comprises a root section 11 with a root 111 and, at its opposite end, a tip section 12 with a tip 121. The rotor blade 10 further comprises a trailing edge section 14 with a trailing edge 141 and a leading edge section 13 with a leading edge 131. The trailing edge section comprises approximately ten percent in chordwise extension away from the trailing edge 141 as such; the leading edge section 13 comprises approximately ten percent in chordwise extension away from the leading edge 131. Typically, the leading edge section 13 is shaped round with a relatively small curvature, while the trailing edge section 14 is typically shaped relatively sharp and featuring an edge. The trailing edge 141 and the leading edge 131 divide the outer surface of the rotor blade 10 into a suction side 15 and a pressure side 16.

Erosion of the leading edge section 13 is a typical problem if the wind turbine operates under harsh conditions, which is typically the case. Leading edge erosion may be due to dirt, dust, insects and the like. Leading edge erosion causes a problem with regard to the structural integrity and stability of the rotor blade but also generally reduces the aerodynamic efficiency and performance of the rotor blade and consequently of the wind turbine as well. Although there exist several measures to avoid or alleviate leading edge erosion, the relatively complex and costly mounting of a protective shield 20 can often not be avoided. The protective shield 20 typically covers between a few percent, such as five percent and twenty percent in chordwise extension of the rotor blade in the outboard section of the rotor blade. Mainly the outboard section of a rotor blade is prone to leading edge erosion, such that the outer twenty or outer thirty percent of the rotor blade are protected typically by a protective shield at the most. The protective shields can be segmented in several individual shields of, for example, a length of one meter each.

FIG. 2 shows a top view on the pressure side 16 of the tip section 12 of a rotor blade 10. The rotor blade 10 is equipped with a plurality of shields in order to protect the leading edge and parts of the leading edge section from erosion. Specifically, there is shown a tip shield 201 which is adjacent to a first shield 202, which is adjacent to a second shield 203, which is adjacent to a third shield 204, which is adjacent to a fourth shield 205, which is adjacent to a fifth shield 206. During mounting of the individual shields 201-206, it is normally started with a tip shield 201 as this tip shield 201 has a very characteristic shape and acts like a sleeve for the tip 121 of the rotor blade 10. Subsequently, the first shield 202 is mounted, wherein different measures and ways exist to realize a joint between the tip shield 201 and the first shield 202. It is important that the joint both is reliable and does not harm the aerodynamic efficiency of the rotor blade at that section. A well-known concept of a joint in this context is to provide a certain overlap of, for example, one to five percent of the length of a shield. The overlap may be constructed even such that the thickness of the overlapping shields diminishes correspondingly, such that the total thickness in the transition region, i.e. the overlap region, is constant.

FIG. 3 shows a top view on the tip section 12 of a rotor blade 10 with a view onto the leading edge 131 of the rotor blade 10. As the top view is onto the leading edge 132, one half of the suction side 15 and approximately one half of the pressure side 16 is also visible, in contrast to the trailing edge which is not visible in this perspective. Here it can be seen that the shields 201, 202, 203 actually only cover a relatively small area of the surface of the rotor blade. In the example shown in FIG. 3, the individual shields approximately cover both parts, i.e. the pressure side 16 and the suction side 15 to a similar extent.

FIG. 4 shows a perspective view of a shield 20. The shield 20 comprises a root end 21 which is referred to as the root end 21 because if the shield is mounted to the surface of a rotor blade 10, the root end 21 of the shield 20 is arranged and prepared to face towards the root 111 of the rotor blade 10. Likewise, the opposite end of the shield 20 is referred to as the tip end 22 because the tip end 22 of the shield 20 is arranged and prepared to face towards the tip 121 of the rotor blade 10.

Additionally, the shield 20 comprises an upper edge 23 and a lower edge 24. The innovative feature of the protective shield 20 as shown in FIG. 4 is the mark 30 which can partly be seen at the root end 21 of the shield 20. The mark 30 is realized as a plurality of indicators, namely a centerline indicator 311, an upper range indicator (not visible in FIG. 4) and a lower range indicator 313. These indicators 311, 312, 313 are realized as lines and are printed on the shield 20. The centerline indicator 311 indicates the center or centerline of the shield 20 and is destined to be aligned with a leading edge 131 of a rotor blade. The upper and lower range indicators 312, 313 indicate a maximum deviation from the centerline which is still acceptable. In other words, they indicate a tolerance range or tolerance band for mounting the shield 20 to the surface of a rotor blade.

Note, that in the case of overlapping shields and starting from the tip towards the root as described in connection with FIG. 2, providing a mark on the tip end 22 of the shield 20 would not bring a further advantage as here the leading edge is not visible in general, because the tip end 22 is supposed to lie directly on the area adjacent to the root end of the other shield and not directly on the surface of the rotor blade.

FIG. 4 also depicts another indicator, namely a heating mat indicator 315. The heating mat indicator 315 is arranged in the center part of the shield 20, between the root end 21 and the tip end 22 of the shield 20. The heating mat indicator 315 is aligned substantially in parallel to the root end 21 and the tip end 22.

The purpose of the heating mat indicator 315 is to give a reference line for arranging a heating mat on the surface of the shield 20. In the exemplary embodiment illustrated in FIG. 4, the heating mat is intended to be placed over approximately half of the shield 20 (with respect to the lengthwise extension of the shield 20) and thus shall be placed until the heating mat indicator 315. In principle, any other shape and location of a heating mat indicator is possible as well.

Figure 5:
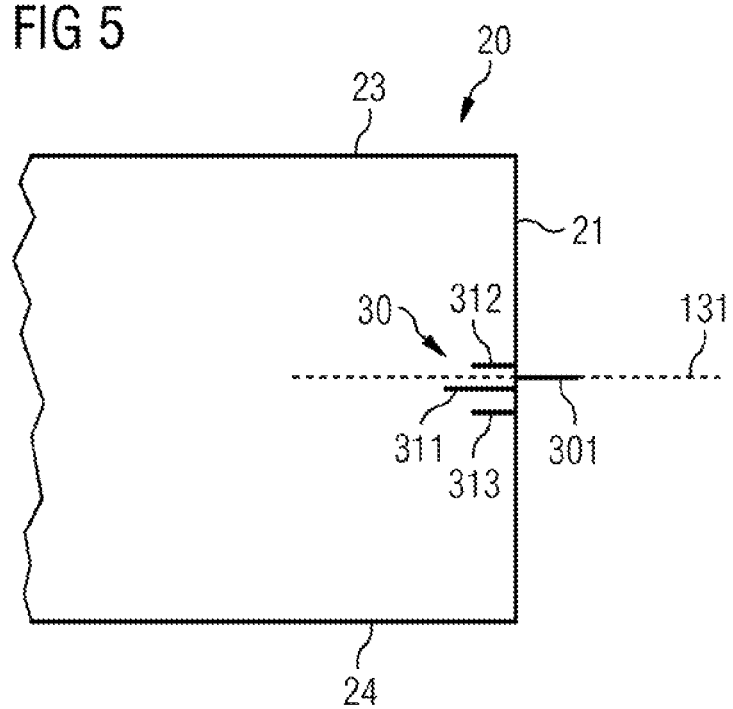
FIG. 5 shows a first embodiment of a shield with a mark.

FIG. 5 shows a first concrete embodiment of a mark 30 on a shield 20. Again, the mark 30 is provided at the root end 21 of the shield 20. The mark 30 is realized in this embodiment again as an entity of three indicators, namely a centerline indicator 311, an upper range indicator 312 and a lower range indicator 313. Here it can be seen how the shield 20 would or could be placed with regard to the leading edge 131 of the rotor blade and which would represent an acceptable level of accuracy of the mounting. This would be acceptable because the leading edge does not need to be perfectly aligned and fitted with the centerline indicator 311. It is generally acceptable if the leading edge is situated within the upper and lower range indicators 312, 313.

FIG. 6 shows a second embodiment of the invention. Here the mark 30, which is also arranged at the root end 21 of the shield 20, comprises, in addition to the centerline indicator 311, the upper range indicator 312 and the lower range indicator 313, a plurality of further indicators, so-called intermediate indicators 314. These intermediate indicators 314 are arranged between the centerline indicator 311 and the upper range indicator 312 and the lower range indicator 313, respectively. If additional information regarding deviation of the concrete and actual mounting of the shield 20 with regard to the leading edge 131 is required, these intermediate indicators 314 are useful.

Note, that in this regard the leading edge 131 is only an example of a point of reference at the rotor blade with which the mark 30 of the shield 20 can be brought in alignment. The point of reference may also be called a corresponding mark 301. It is this corresponding mark 301 which is brought in alignment with the mark 30 of the shield 20. In the second embodiment as illustrated in FIG. 6, the linear distribution of the intermediate indicators 314 facilitates an assessment or analysis of the accuracy which analysis may, for example, be carried out by a computer after taking a photograph and storing the photograph on a hardware.

Note that the corresponding mark 301 is not visible where the shield 20 is arranged upon the corresponding mark 301. This is valid for all corresponding marks 301 shown in FIGS. 5-8.

FIG. 7 shows a third embodiment of a mark 30 of a shield 20. This time, the mark 30 is realized as a notch or recess 32. The notch has a V-shape comprising a first flank 321, a second flank 322, and a common endpoint 323 where the first flank 321 meets the second flank 322. In other words, there is provided a cut-out in the shape of a triangle wherein the vertex of the triangle is away from the root end 21 of the shield 20. Such a v-shaped notch 32 may have the advantage of an easier alignment during mounting of the shield 20 on the surface of the rotor blade. In the example shown in FIG. 7, it can be seen that the shield has been aligned relatively far away from the ideal position which would typically be with the common end point 323 of the notch 32.

Figure 8:
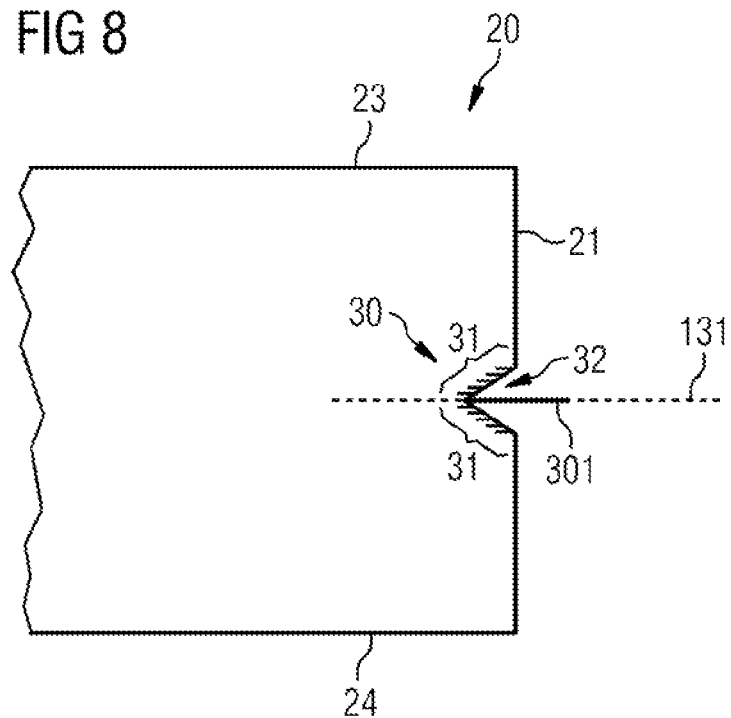
FIG. 8 shows a fourth embodiment of a shield with a mark.

FIG. 8 shows a fourth embodiment of the invention, wherein the mark 30 is realized as a v-shaped notch 32 and comprises indicators 31. The indicators 31 are placed or arranged at the first flank 321 and the second flank 322. This facilitates assessment of the precision and concrete actual position of the shield with regard to a corresponding mark 301 of the rotor blade.

Figure 9:
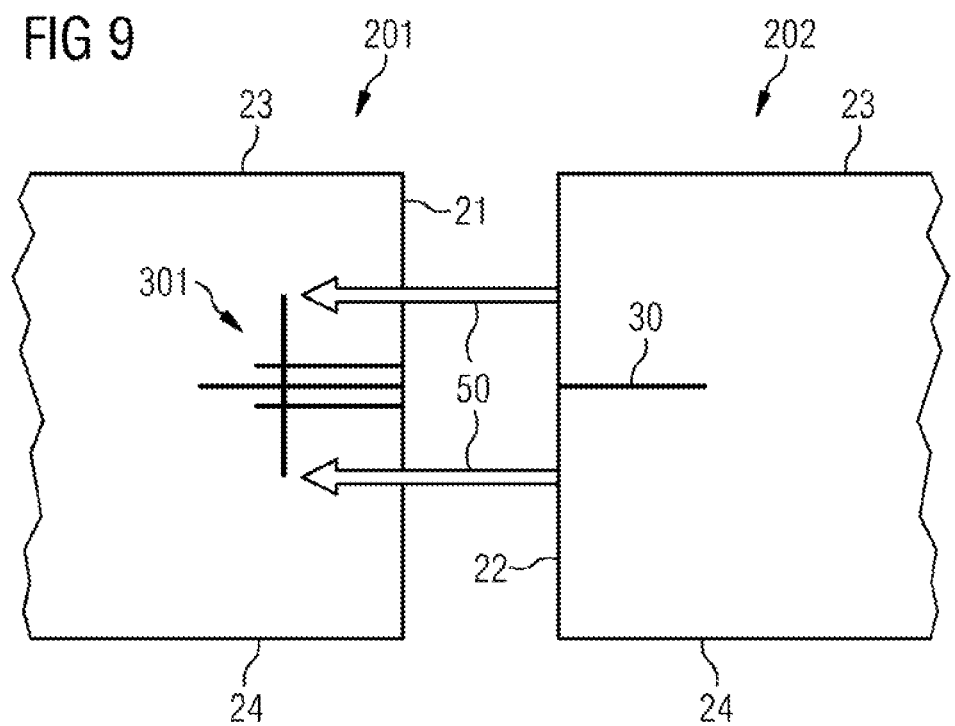
FIG. 9 shows an example of aligning a second shield with a first shield.

FIG. 9 shows how to align plural shields, namely a second shield 202 with a first shield 201, with each other. Assume that the first shield 201 is already rigidly mounted to the surface of the rotor blade. The second shield 202, in contrast, still needs to be mounted to the rotor blade. In order to accurately choose a predetermined position for the second shield 202, the mark 30 of the second shield 202 is aligned with a corresponding mark 301 of the first shield.

In the example as illustrated in FIG. 9, the mark 30 of the second shield 202 is realized as one single indicator placed at the tip end 22 of the second shield 202. The corresponding mark 301 of the first shield 201 is realized as three indicators (centerline indicator, upper range indicator and lower range indicator) which are placed at the root end 21 of the first shield. There is furthermore provided a further indicator which is perpendicular to the three mentioned indicators and which indicates the region of overlap between the first and second shield 201, 202.

The alignment of both shields 201, 202 is carried out by placing the tip end (section) 22 of the second shield 202 on top of the root end (section) 21 of the first shield 201 (cf. the arrows 50 symbolizing the respective translatory movement), while respecting the limit of the overlap indicator and ideally bringing the mark 30 of the second shield 202 in convergence with the corresponding mark 301 of the first shield. An advantage of this way of alignment is that no corresponding mark on the surface of the rotor blade is needed; instead, the corresponding mark is provided at the shield which is adjacent to the shield to be mounted.

Although the present invention has been disclosed in the form of preferred embodiments and variations thereon, it will be understood that numerous additional modifications and variations could be made thereto without departing from the scope of the intention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A protective shield for a rotor blade of a wind turbine, the rotor blade comprising a trailing edge section with a trailing edge and a leading edge section with a leading edge, the trailing edge and the leading edge dividing an outer surface of the rotor blade into a suction side and a pressure side, and the rotor blade comprising a root and a tip, wherein:

the protective shield is configured to protect the leading edge section from erosion, the protective shield is configured to cover at least a part of the leading edge of the rotor blade, the protective shield is preformed with a shape which approximately corresponds to a contour of the leading edge section where the protective shield is configured to be mounted to, the protective shield comprising:

a root end which faces towards the root of the rotor blade; and a tip end which faces towards the tip of the rotor blade; and a mark comprising a plurality of indicators including a centerline indicator configured to be aligned with the leading edge of the rotor blade, and one or more further indicators proximate the centerline indicator that indicate a range of tolerance in which positioning of the protective shield on the outer of the rotor blade is acceptable.

2. The protective shield according to claim 1, wherein the mark comprises at least one indicator for indicating a point of reference at the protective shield.

3. The protective shield according to claim 2, wherein the at least one indicator is printed and/or engraved into the protective shield.

4. The protective shield according to claim 1, wherein the mark is a notch at one of the root end and the tip end of the protective shield.

5. The protective shield according to claim 4, wherein the notch is a V-shaped cutout comprising a first flank and a second flank, further wherein the first flank and the second flank meet at a common endpoint.

6. The protective shield according to claim 1, wherein the mark is a circular cut-out, at one of the root end and the tip end of the protective shield.

7. The protective shield according to claim 1, wherein the mark is provided at the root end of the protective shield.

8. The protective shield according to claim 1, wherein a position of the mark of the protective shield is compared with a position of a corresponding mark that indicates a pathway of the leading edge of the rotor blade.

9. The protective shield according to claim 8, wherein the corresponding mark is provided on the outer surface of the rotor blade or on another shield, which is already mounted on the rotor blade.

10. The protective shield according to claim 1, wherein the tool is a heat blanket for curing a latently reactive adhesive film.

11. An arrangement comprising:

a rotor blade of a wind turbine; and a protective shield comprising a mark having a plurality of indicators including a centerline indicator configured to be aligned with a leading edge of the rotor blade, and one or more further indicators proximate the centerline indicator that indicate a range of tolerance in which positioning of the protective shield on a surface of the rotor blade is acceptable;

wherein the protective shield is firmly attached to the surface of the rotor blade by a latently reactive adhesive film.

12. A method comprising:

a) providing the protective shield according to claim 1 and the rotor blade; and b) positioning the protective shield on the outer surface of the rotor blade such that the mark of the protective shield coincides to a predetermined degree with a corresponding mark on the outer surface of the rotor blade.

13. The method according to claim 12, wherein:

the mark of the protective shield is designed as a scale, the corresponding mark on the outer surface of the rotor blade is a line indicating a pathway of the leading edge of the rotor blade, and step b) further comprises aligning the protective shield such that the line indicating the pathway of the leading edge is within a predetermined range of the scale being provided at the protective shield.

14. A method of documenting how precisely the protective shield according to claim 1 has been attached to the outer surface of the rotor blade of the wind turbine comprising:

a) taking a photo of the protective shield being attached to the rotor blade comprising the mark of the protective shield and the corresponding mark of the rotor blade, and b) saving the photo.

15. The method according to claim 14, further comprising:

c) analyzing by a computer program to which extent the position of the mark of the protective shield coincides with the position of the corresponding mark of the rotor blade.

* * * * *